R. P. SCOTT.
PEA AND BEAN HULLER.
APPLICATION FILED JAN. 6, 1915.
1,192,124.
Patented July 25, 1916.
8 SHEETS—SHEET 2.
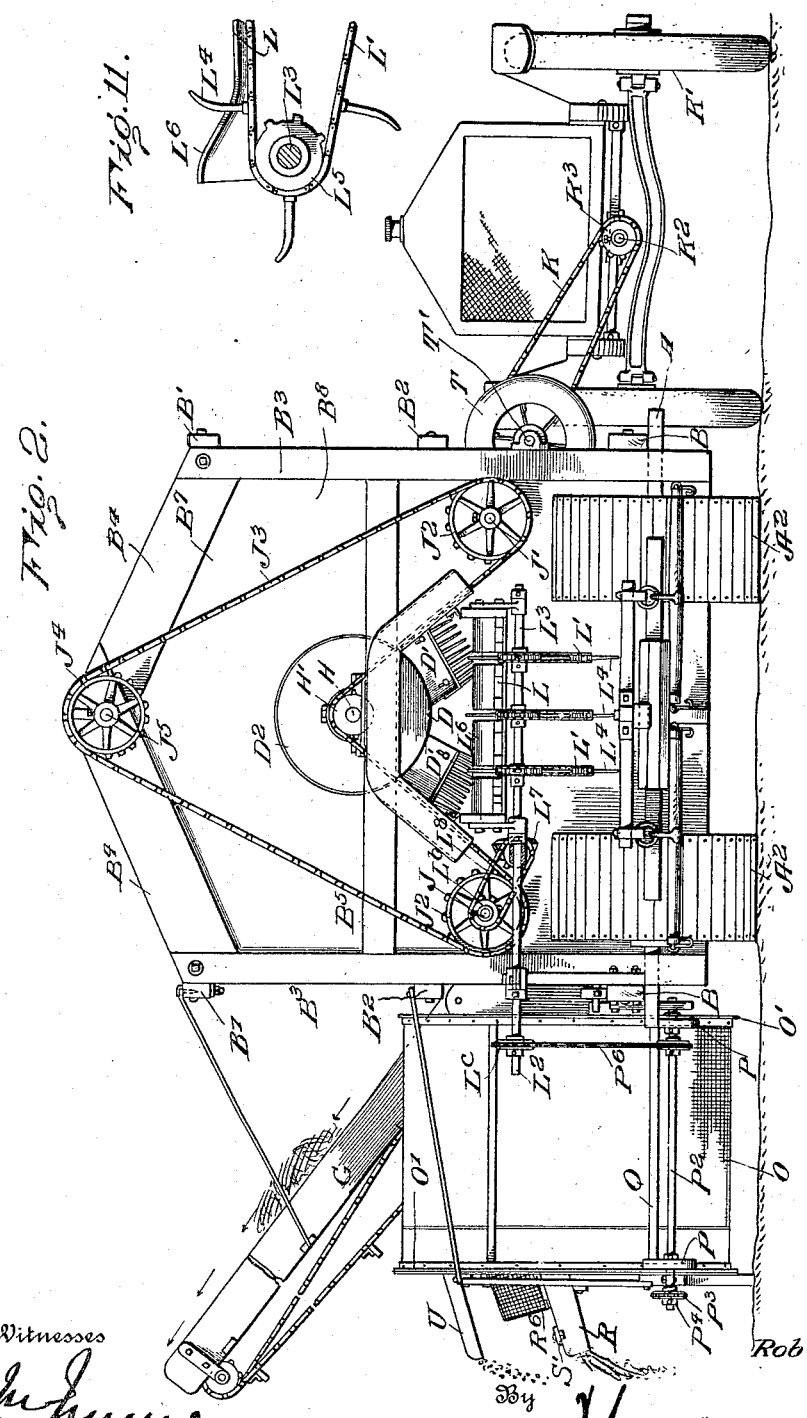

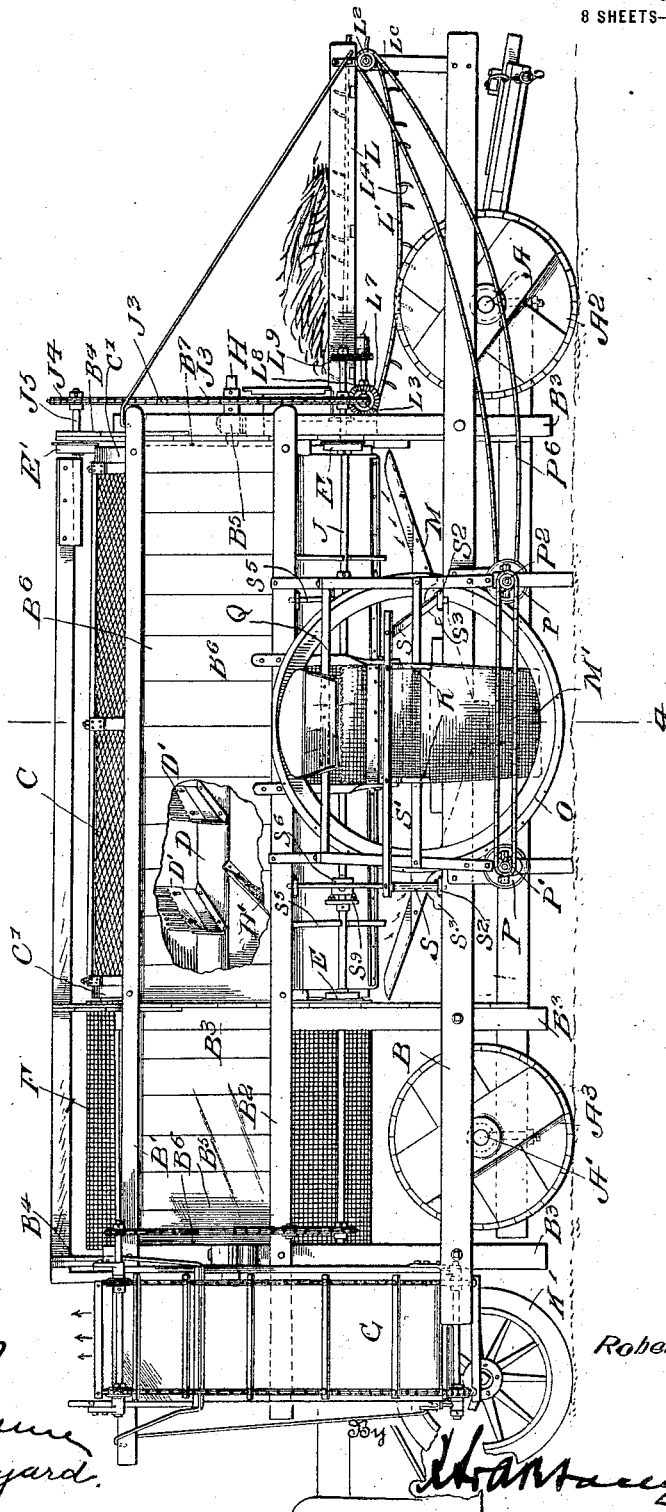

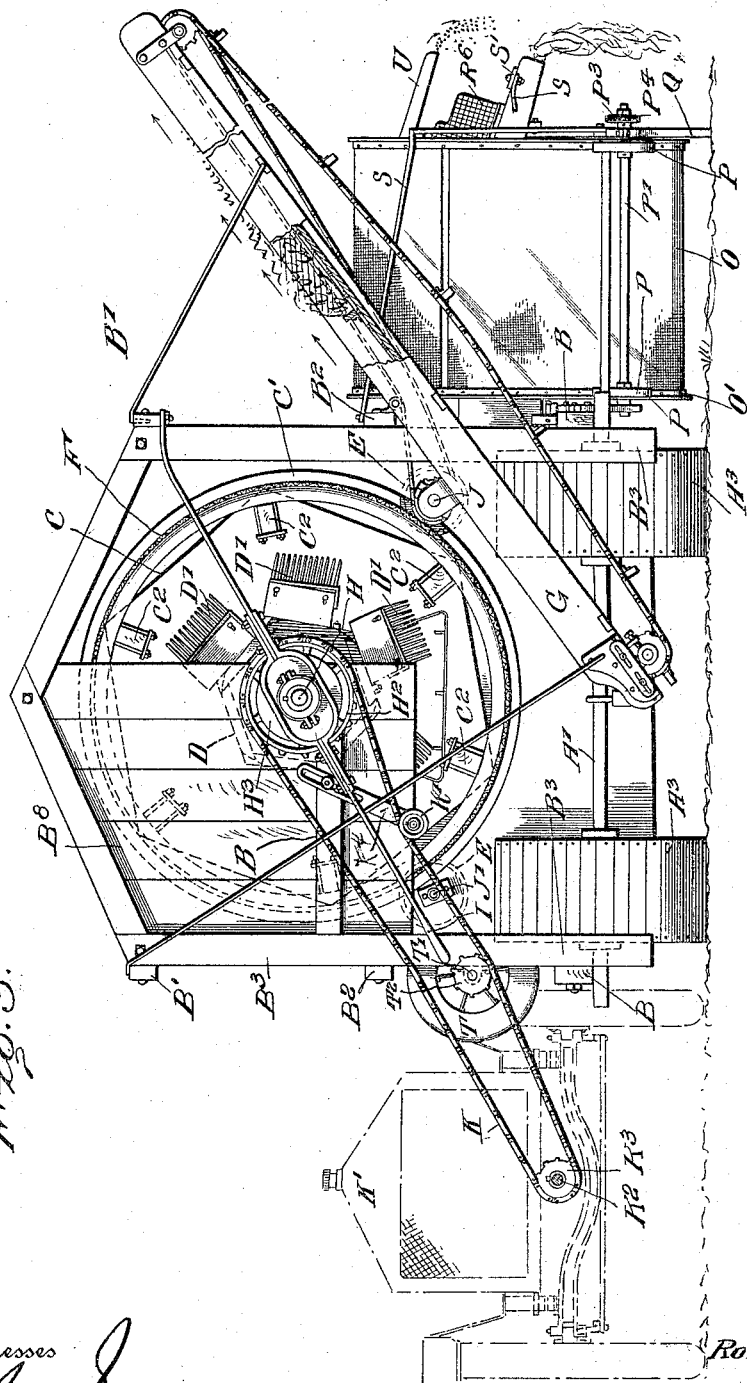

R. P. SCOTT.
PEA AND BEAN HULLER.
APPLICATION FILED JAN. 6, 1915.
1,192,124.
Patented July 25, 1916.
8 SHEETS—SHEET 4.
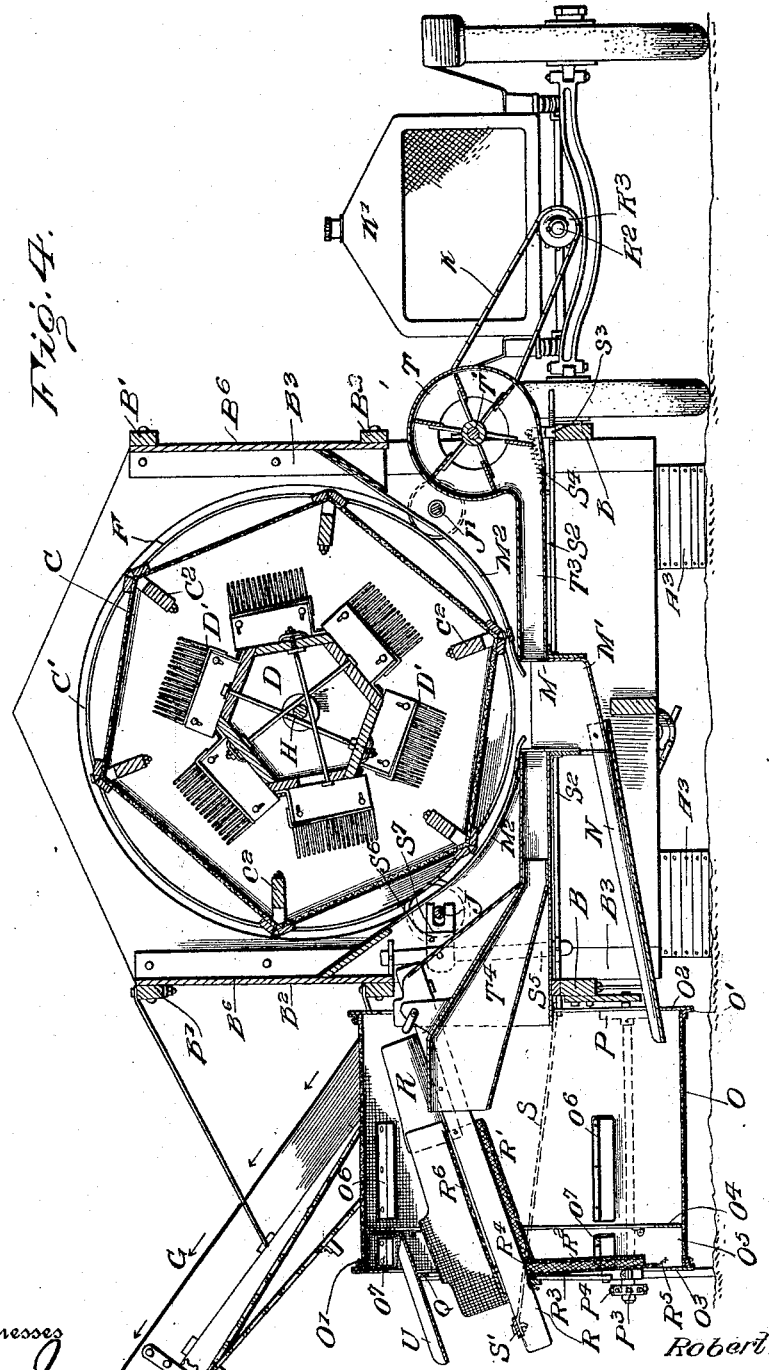

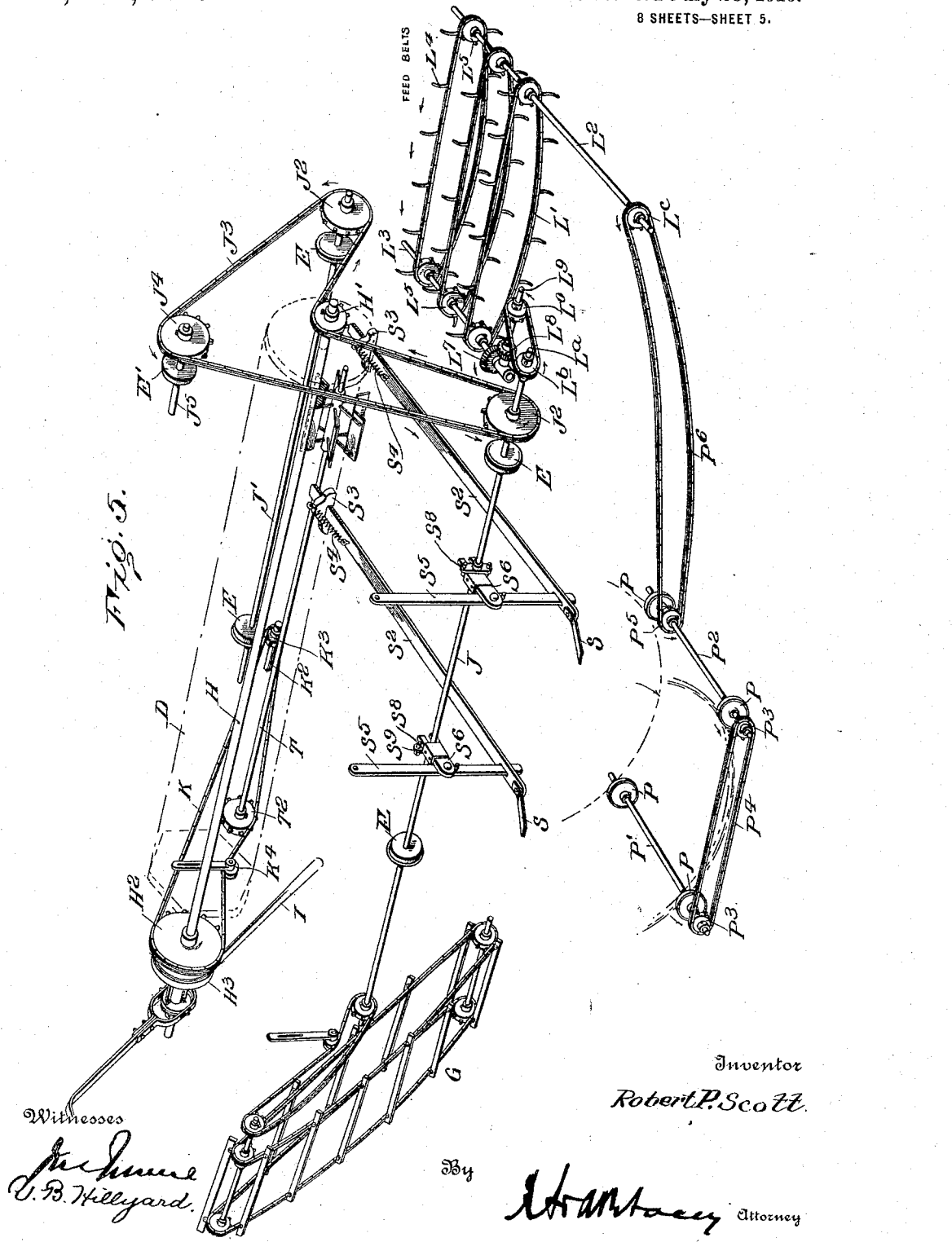

R. P. SCOTT.
PEA AND BEAN HULLER.
APPLICATION FILED JAN. 6, 1915.
1,192,124.
Patented July 25, 1916.
8 SHEETS—SHEET 6.
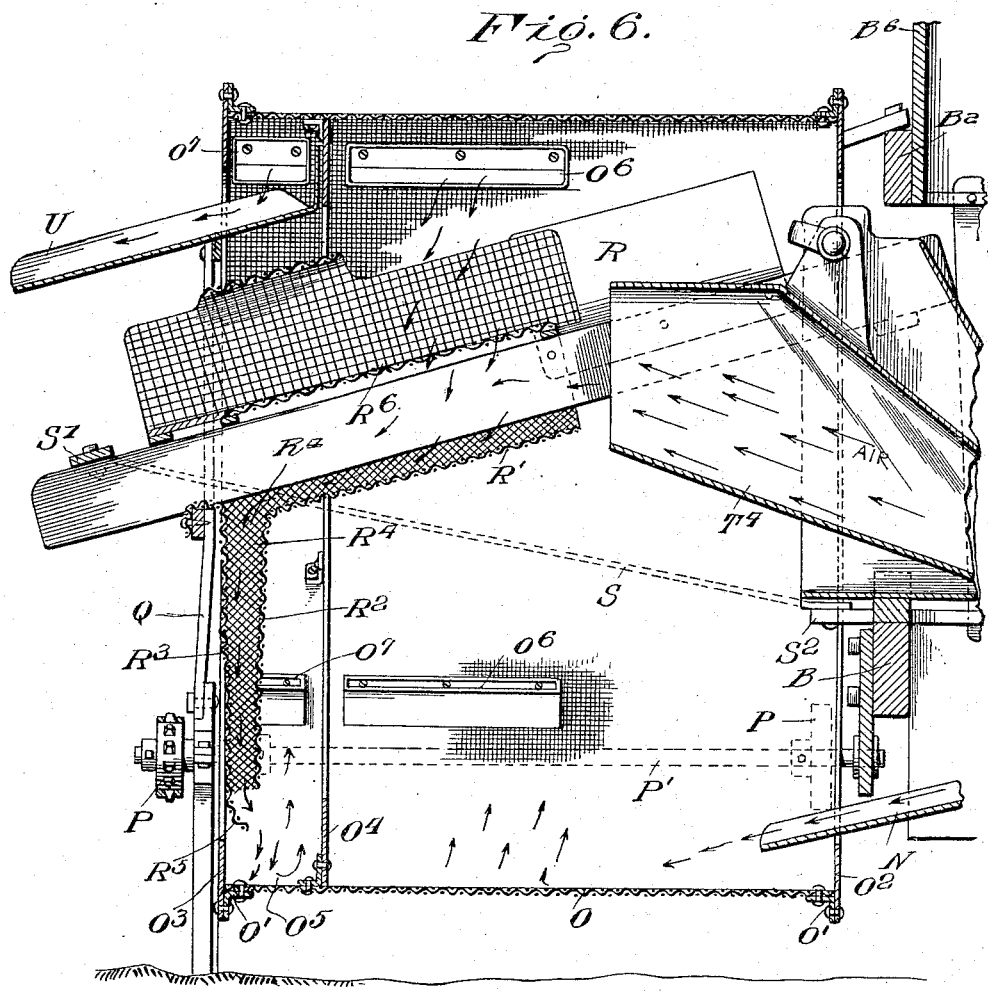
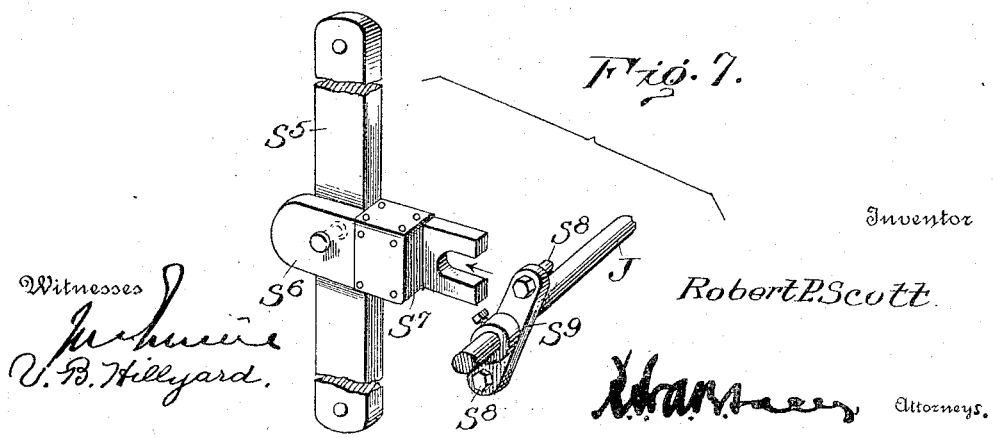

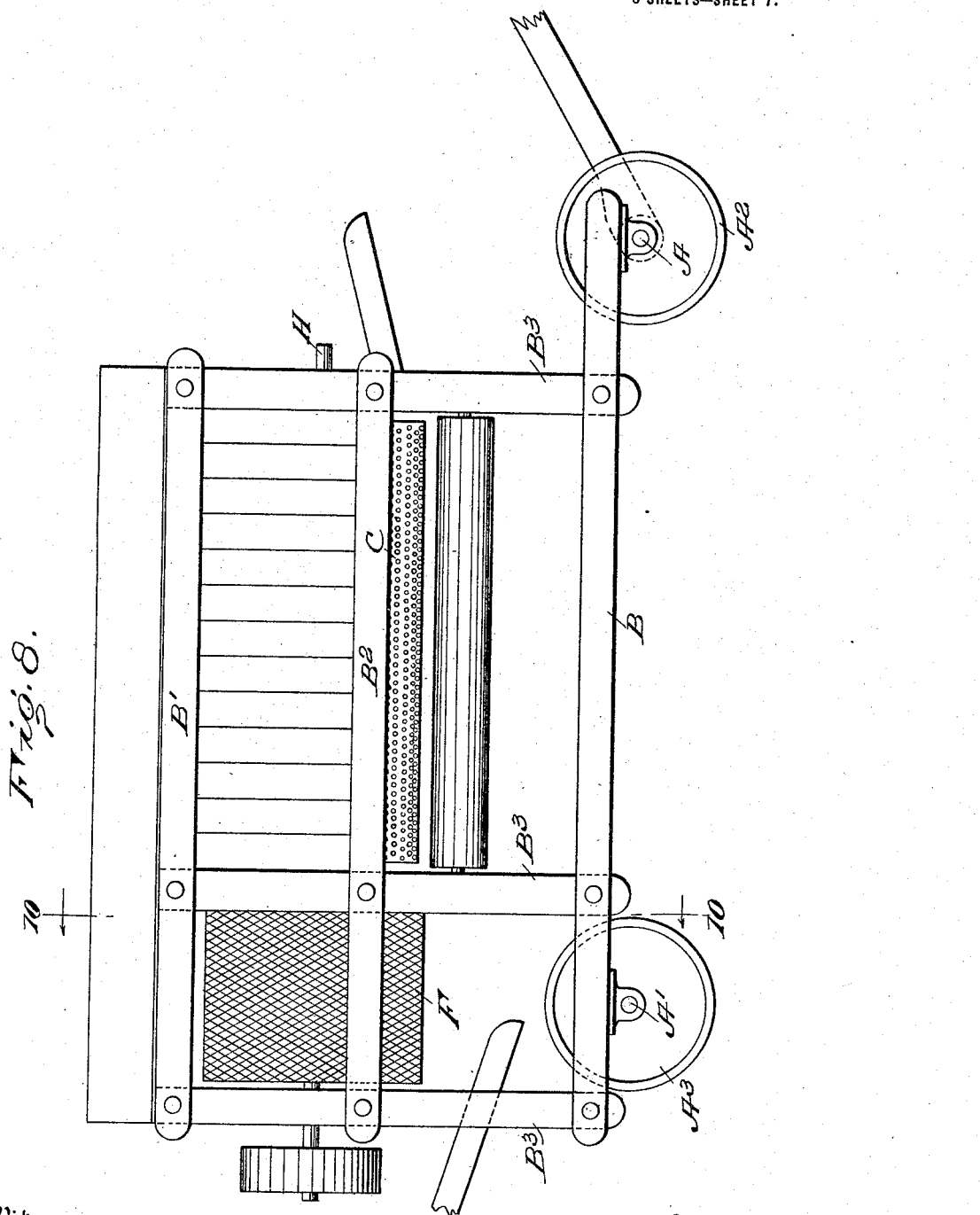

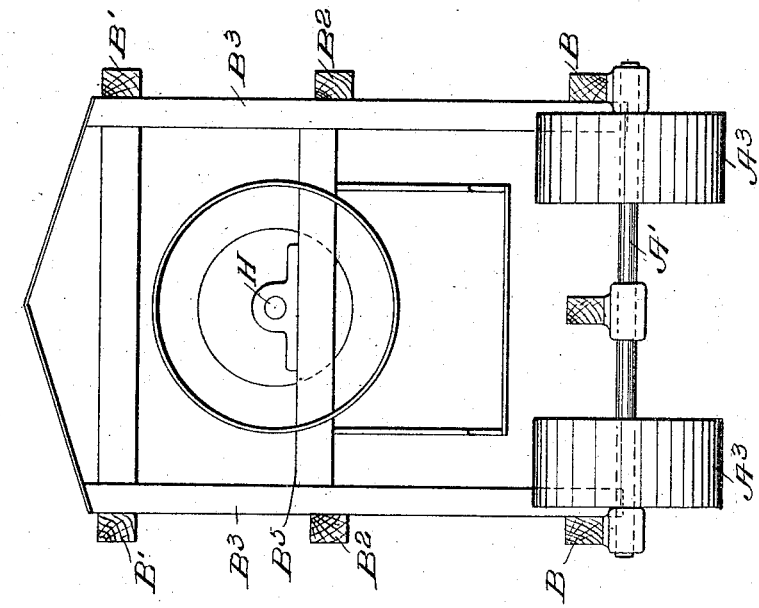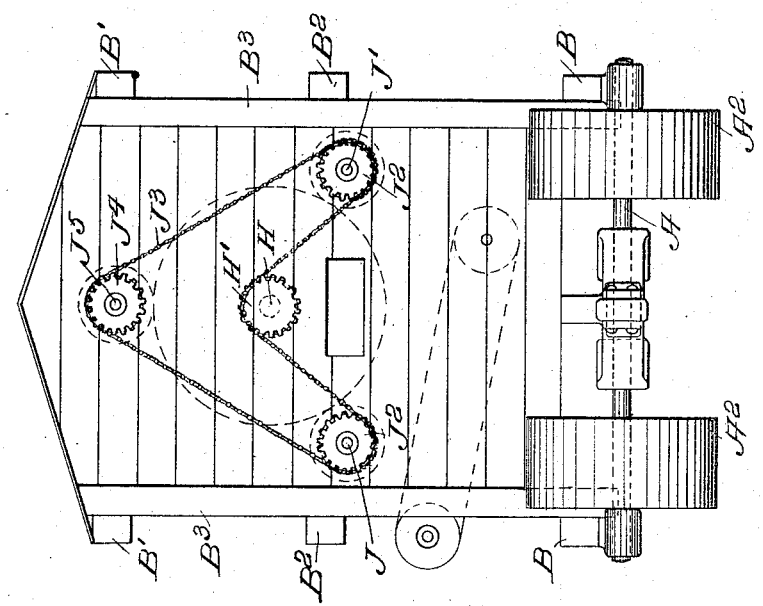

UNITED STATES PATENT OFFICE.

ROBERT P. SCOTT, OF COLUMBUS, OHIO.

PEA AND BEAN HULLER.

1,192,124.  Specification of Letters Patent.  Patented July 25, 1916.

Application filed January 6, 1915. Serial No. 817.

*To all whom it may concern:*

Be it known that I, ROBERT P. SCOTT, citizen of the United States, residing at Columbus, in the county of Franklin and State of Ohio, have invented certain new and useful Improvements in Pea and Bean Hullers, of which the following is a specification.

The invention has relation to machines of the type most especially designed for liberating edible seeds, such as peas and beans, from their pericarps by impact action and without requiring the separation of the pods from the vines, and which machines have the vines fed thereto in mass and discharge the refuse separate from the berries, the latter being delivered into a container or other predetermined receptacle.

The primary purpose of this invention is the provision of a machine for hulling peas, beans, and like product, which is compact and effective in operation and capable of being readily transported from one field to another, or from one place to another upon the same field, without requiring the dismemberment or taking apart of any of the organized structure, thereby avoiding the labor and loss of time incident to the adjustment of such machines in order to render them portable so as to be conveniently shifted from one location to another.

A further purpose of the invention is to combine with the hulling machine a separator for removing every particle of broken hulls, vines, or the like so that the peas or berries when discharged are in condition for immediate use either to be canned or marketed, such separator being mounted upon the main frame of the machine and connected to be operated by the actuating mechanism thereof.

A further purpose of the invention is the provision of a pea and bean huller having the operating parts so arranged as to minimize the handling of the product, the several steps being automatic, the vines, hulls, and like refuse being discharged in one direction and the berries being automatically delivered to the separator and discharged from the latter in a manner to be received in a suitable container.

A further purpose of the invention is to devise a trough of peculiar form arranged to receive the berries from the hulling mechanism and direct such berries to a common point of discharge from which a chute extends to direct the berries into the separator, the trough having an opening through which a blast of air is directed to carry off small pieces of hulls, vines, and like refuse.

The invention furthermore is designed to provide unique means for imparting a vibratory or jigging motion to a shoe forming part of the separator, such mechanism being constructed to equalize the strain and avoid any possible binding of the moving parts which would tend to detract from the efficiency of the machine and incur a material loss of power.

A further purpose of the invention is the provision of a pea and bean huller and separator which is compact, relatively light in structure, readily transportable and capable of being driven by any suitable motive power, such as a motor-vehicle, or portable engine.

A further purpose of the invention is the arrangement of the driving mechanism so as to distribute the load throughout the machine and to arrange the parts whereby access may be readily had thereto for repairs, inspection or other desired purpose.

While the foregoing calls attention to some of the principal objects of the invention it is to be understood that other purposes and advantages will appear and suggest themselves as the nature and details of the invention are understood and to this end reference is to be had to the drawings hereto attached, taken in connection with the following description.

Figure 1 is a side view of a bean and pea huller and separator embodying the invention. Fig. 2 is a front view of the machine as it appears in operation. Fig. 3 is a rear view. Fig. 4 is a transverse section on the line 4—4 of Fig. 1. Fig. 5 is a diagrammatic view of the operating mechanism. Fig. 6 is an enlarged vertical central longitudinal section of the separator. Fig. 7 is a perspective view of the means for imparting a vibratory movement to the separating shoe. Fig. 8 is a side view of a machine embodying the invention, the feeder, elevator and separator being omitted. Fig. 9 is a front view of the same. Fig. 10 is a section on the line 10—10 of Fig. 8 looking to the rear, as indicated by the arrows. Fig. 11 is a detail view of one end of the feed belts.

Corresponding and like parts are referred to in the following description and indicated in all the views of the accompanying drawings by the same reference characters.

The framework is mounted upon a front axle A and a rear axle A¹, the front axle being provided with wheels A² and the rear axle with wheels A³. The treads of the wheels A² and A³ are broad so as to prevent their sinking in soft ground when the machine is at rest or is traveling from one place to another. The framework is of such construction as to insure a compact arrangement of the parts which is essential to the provision of a machine which may be practically portable so as to be easily moved from one field to another or from one place to another upon the same field. As shown, the framework comprises longitudinal sills B, upper side beams B¹, intermediate side beams B², a plurality of uprights B³ and transverse beams B⁴ and B⁵. The upper portion of the framework is closed at its ends and sides so as to protect the hulling mechanism and form an inclosure for retaining the berries when liberated from the pods. The sides of the framework are indicated at B⁶. These sides are comprised between the upper and lower side beams B¹ and B². The front wall is designated by B⁷ and the rear wall by B⁸. It is to be understood that the framework may be constructed of any material.

The hulling mechanism is mounted within the framework and comprises concentric drums C and D, both mounted for rotation. The outer drum C is adapted to receive the mass of vines containing the pods from which the berries are to be liberated. The drum D constitutes the huller proper since it threshes or beats the pods and opens the same and releases the seeds. The drum C is mounted on travelers E and is prevented from vertical movement at its front end by means of a traveler E¹. The drum is provided with external circular tracks C¹ which engage the respective travelers E. The drum C is open throughout its length and is provided upon its inner wall with a plurality of ribs C² which constitute lifters for elevating the mass of vines containing the pods to be hulled. A rotary screen F is connected with the rear end of the drum C and forms a continuation thereof, such rotary screen serving to remove any berries that may be carried from the drum C in the discharge of the refuse therefrom, such berries being gathered in any manner. The refuse consisting of the vines and broken hulls is discharged from the rear end of the screen F and is received by an elevator G which delivers the same to one side of the machine. The drum C may be of any construction such as usually employed in pea and bean hulling machines.

The inner drum D is secured upon a shaft H which passes centrally through the drum C and is mounted at or near its ends in suitable bearings provided at the ends of the main frame. This drum may be of any formation according to the design of the machine and is provided upon its exterior with a plurality of beaters D¹ which have a helical arrangement to positively feed the material through the drum C. The beaters D¹ may be of any formation such as generally employed to operate by impact in pea and bean hulling machines of the type to which this invention appertains. While the finger beaters work more or less by the old impact process the fingers do not present an even smooth surface but an uneven or rough surface which tends to bend the pod and break it as disclosed in a former patent granted to me.

As shown, the drum D is hollow and is closed at its front and by means of a circular head D² which fits snugly within a circular opening formed in the end B⁷. The shaft H is provided at its front end with a sprocket gear H¹, and near its rear end with a sprocket wheel H² which is loose upon the shaft and is adapted to have the power applied thereto for driving the machine. The clutch H³ is splined upon the shaft H and is adapted to coöperate with the sprocket-wheel H² to cause the shaft H and sprocket wheel H² to rotate in unison. A lever I is provided for operating the clutch H² and may be connected with such clutch in any ordinary manner.

Shafts J and J¹ are located upon opposite sides of the framework and extend lengthwise thereof and are provided at their front ends with sprocket wheels J². One of these shafts is connected with the traveling member of the elevator G and both of such shafts are connected for simultaneous rotation by means of a sprocket chain J³, the same passing over the sprocket wheel H¹, around and beneath the sprocket wheels J² and over a sprocket wheel J⁴ secured to the outer end of a shaft J⁵ upon which the upper traveler E¹ is secured. In this manner the several shafts J, J¹ and J⁵ are positively rotated together with the travelers E and E¹ fastened thereon. As a result the outer drum C is positively rotated. The lower run of the sprocket chain J³ passing over the sprocket H¹ and beneath the sprocket wheels J² results in driving the shafts J, J¹ and H in reverse directions, hence the drums C and D are driven in the same direction. Rotary movement is imparted to the shaft H from a suitable source of power by means of a sprocket chain K which passes around the sprocket wheel H². For convenience of illustration a motor vehicle K¹ is illustrated as the motive power, the engine shaft K² thereof being provided with a sprocket-wheel K³ around which the sprocket-chain K passes. It is to be understood that a portable motor of any type may be utilized for operating the machine and a belt tightener K⁴ coöperates with the sprocket-chain K to take up any slack therein.

A feeder is arranged at the front of the machine in advance of the hulling mechanism for receiving the mass of vines containing the pods to be hulled. This feeder is mounted upon front extensions of the side sills B and comprises a table L and a plurality of endless chains L¹ supported upon shafts L² and L³ arranged at opposite ends of the table L and mounted in suitable bearings. Each of the endless chains L¹ is provided with a plurality of fingers L⁴ which engage the material and move the same over the table L into the receiving drum C. The fingers L⁴ are rearwardly curved with reference to their direction of travel when advancing the material to the hulling mechanism. The shafts L² and L³ are provided with sprocket wheels L⁵ which form supports for the endless chains L¹. The feeder is arranged with reference to the drum C to insure delivery therein of the material after the latter is discharged from the table L by means of the endless chains. For this purpose, the end wall B⁷ is provided in its lower portion with an opening D through which the material passes, as indicated most clearly in Fig. 2. The table L may be of any construction and is provided at its sides with guards to prevent the material falling therefrom and is formed intermediate of its longitudinal edges with slots for the passage of the fingers L⁴. The inner end of the table is upwardly deflected at L⁶ to form a stripper to clear the material from the fingers L⁴ and prevent such fingers from carrying the material downward around the inner shaft L³. This is indicated most clearly in Fig. 6 which shows the portion L⁶ of the table curved upwardly and rearwardly to a height to insure the removal of the material from the fingers as the latter travel rearward and downward at the inner end of the table. The shaft L³ is provided at one end with a miter gear L⁷ which meshes with a miter gear L⁸ fastened to a longitudinal shaft L⁹. The sprocket-wheel Lᵒ secured on the shaft L⁹ is connected by means of a sprocket chain Lᵃ with a sprocket wheel Lᵇ secured to the forward end of the shaft J. By this means the shaft L³ receives motion from the shaft J. The shaft L² is positively driven by means of the endless chains L¹ which connect the two shafts L³ and L² by passing around the sprocket wheels L⁵ secured to such shafts. The shaft L² is extended and is provided at its outer end with a sprocket-wheel Lᶜ from which power is taken for operating the separator.

Beneath the hulling mechanism is located a trough M which is comparatively narrow and of a length corresponding with the length of the drum C. The side walls of the trough M are preferably parallel and the bottom of the trough has its end portions oppositely inclined, as indicated most clearly in Fig. 1, and leading into a centrally disposed spout M¹ whose bottom is transversely inclined to direct the berries laterally into a chute N which extends transversely and is outwardly and downwardly inclined. Plates M² are disposed at opposite sides of the trough M and curve upwardly and outwardly and are joined at their upper longitudinal edges to the side walls B⁶. The lower edges of the plates M² extend over the upper edges of the side walls of the trough M and curve downwardly to insure delivery of the berries into the trough. The plates M² conform to the circumference of the drum C and are adapted to receive the berries as they are hulled and pass outward through the openings in the wall of the drum C. The plates M² and trough M unitedly form in effect a pan for catching the berries as they escape through the openings in the wall of the drum, so as to gather such berries and direct them into the chute N. The trough M and side plates M² may be attached to the framework of the machine in any convenient and substantial way.

The separator is located at one side of the machine and comprises a drum O which is mounted to rotate upon travelers P. The drum O is provided at opposite ends with circular tracks O¹ which are flanged to engage the travelers P and prevent longitudinal movement of the drum. The wall of the drum is formed with openings to provide an escape for small particles of vines, hulls and like refuse. The drum is open throughout its length and is formed at its inner end with an inwardly extending flange O² and at its outer end with an inner flange O³, such flanges being designed to retain the berries within the drum during the cleaning process. A flange O⁴ is arranged near the outer end of the drum and is spaced from the flange O³ a short distance. The flange O⁴ projects inwardly to a greater extent than the flange O³. The space formed between the two inner flanges O³ and O⁴ is indicated at O⁵. Ribs or flights O⁶ and O⁷ project inwardly from the wall of the drum and constitute lifters for elevating the berries and dropping the same into the separating shoe. The flights O⁷ are comparatively short and are arranged in the space O⁵. The flights O⁶ are relatively long and are disposed near the flange O⁴. The drum O and adjunctive parts are mounted upon a framework Q which projects laterally from the main frame of the machine in any substantial way. The drum O is rotated by means of the travelers P which are attached to shafts P¹ and P². The outer ends of the shafts P¹ and P² have sprocket wheels P³ secured thereon, such sprocket wheels being connected by means of a sprocket chain P⁴ whereby movement imparted to one of the shafts is transmitted to the other. A sprocket-wheel P⁵ secured upon the shaft P² is connected by means of a sprocket chain P⁶ with the sprocket wheel L⁶ of the shaft L² and in this manner movement is transmitted from the shaft L² to the shaft P², thence to the shaft P¹ by means of the gearing disclosed thereby rotating the drum mounted upon the travelers P. The shafts P¹ and P² are mounted in suitable bearings carried by the framework Q.

The separating shoe for removing the last trace of any foreign matter from the berries is located within the upper portion of the drum O and is mounted in any way to admit of a reciprocating or jigging movement being imparted thereto so as to facilitate the operation of removing foreign particles from the berries. The shoe comprises a frame R which is arranged at an inclination to the horizontal so as to cause the material to move thereover by gravitative action. The frame of the shoe has a projecting portion which extends beyond the outer end of the drum O so as to deliver the refuse at a safe distance from the separator. The frame R is closed at its bottom by means of a screen R¹, the openings of which are of a size to prevent the passage therethrough of the berries. The screen bottom R¹ terminates at its outer end about in the plane of the outer end of the drum O and makes connection with a vertical wall R² which depends from the bottom R¹ and terminates at its lower end a short distance from the lower wall of the drum O. A second wall R³ is disposed outward from the wall R² and is spaced therefrom and projects upward to a greater height than the wall R² so as to arrest the berries and cause the same to pass downward into the space R⁴ formed between the two walls R² and R³. The lower end of the wall R³ projects below the lower end of the wall R² and terminates in an inwardly extending lip R⁵ which directs the berries into the space O⁵ and away from the flange O³. A second screen R⁶ is arranged above the bottom screen R¹ and the openings therein are of a size to admit of the berries passing readily therethrough. The screen R⁶ serves to remove refuse or foreign matter from the berries during the cleaning operation. The separating shoe has a longitudinal reciprocatory or jigging movement imparted thereto.

Rods S are connected at their outer ends to a cross-bar S¹ attached to the projecting end of the frame R and extend laterally beyond the sides of such frame to enable the rods S to clear the frame. The inner rear ends of the rods S are attached to bars S² which extend transversely of the machine and are supported at their inner ends in guides S³. Springs S⁴ of the contractile type normally tend to draw the bars S² inward. Links S⁵ pivotally supported at their upper ends have their lower ends in engagement with the bars S², preferably by passing through openings in such bars and being pinned thereto. The links S⁵ have a vibratory movement imparted thereto and this movement is transmitted to the bars S² and rods S and imparts a corresponding movement to the separating shoe. Each of the links S⁵ is provided with a rearwardly extending member S⁶ which is pivoted thereto and has its rear end forked to receive the shaft J. Each of the extensions S⁶ is formed with a vertical shoulder S⁷ which is adapted to be engaged by means of tappets S⁸ projecting laterally from a cross bar S⁹ secured to the shaft J so as to rotate therewith. As the shaft J rotates the tappets S⁹ engage the shoulder S⁷ and move the parts S⁶ outward against the tension of the spring S⁴. When the tappet S⁸ clears the shoulder S⁷ the spring S⁴ draws the bar S² inward.

A fan blower T is located upon the opposite side of the machine to the separator and such fan blower comprises a casing and fan, the latter being secured to a shaft T' which parallels the shaft J¹ and is disposed near thereto. The fan shaft T' is mounted in suitable bearings and has a sprocket-gear T² fastened thereto and arranged to engage a run of the sprocket chain K by means of which motion is imparted to the shaft T¹ for operating the blower. A spout T³ extends from the fan casing and connects with the near side wall of the trough M. The spout T³ is interrupted opposite the trough M and continues beyond the opposite side of such trough and connects with a chamber T⁴ which inclines upwardly and laterally and terminates opposite the inner ends of the separating screens R¹ and R⁶ so as to deliver a blast of air across the separating shoe to carry off light particles of foreign matter. The chamber T⁴ constitutes an extension of the spout T³ and flares toward its delivery end to insure the discharge of the air blast in a manner to carry off the light particles from the berries.

In the operation of the machine, the vines containing the pods from which the berries are to be liberated are placed in mass upon the table L and are fed to the hulling mechanism by means of the feeder chains L¹. The vines after reaching the inner end of the table L are received in the drum C and are elevated by means of the lifters C². As the vines drop from an elevated position, they are acted upon by means of the beaters D¹ of the inner or hulling drum D and the impact of such beaters breaks the hulls and liberates the berries therefrom. The vines are moved through the drum C by the action of the beaters D¹ which, as stated, have a helical arrangement, thereby moving the vines through the drum by a screw action. The berries liberated from the pods or pericarps pass through the openings in the wall of the drum C and are received upon the wings or plates M² of the pan arranged beneath the hulling mechanism. The berries pass from the wings or plates M² into the trough M and collect in the spout M¹ and discharge therefrom onto the chute N which deliver the berries into the drum O. As the berries pass from the wings or side plates M² into the trough M they are subjected to a blast of air from the fan blower and this blast of air drives off the greater part of the small pieces of hulls, vines and the like which escape from the drum C together with the berries. After the berries have entered the drum O they are subjected to a movement by reason of the rotation of such drum which acts to further remove small foreign particles of broken hulls, stems, vines and the like, such foreign matter escaping through the openings formed in the wall of the drum O. After the berries pass to the outer portion of the drum O, they are engaged by the flights O⁶ which elevate the same and drop the berries into the shoe, such berries being received upon the screen R⁶ and passing therethrough to the screen bottom R¹. As the berries drop from the upper portion of the drum they are subjected to a blast of air delivered from the spout T⁴, which carries off the last traces of any foreign matter that may have escaped the previous cleaning steps. The berries received on the screen bottom R¹ gravitate outwardly and downwardly to the space R⁴ which constitutes a passage through which the berries are directed into the space O⁵ formed at the outer end of the drum O. After the berries have entered the space O⁵ they are again elevated by means of the flights or lifters O⁷ and are dropped upon a chute U by means of which they are discharged from the machine to be received in a suitable vessel arranged for the reception of the berries which are now in condition either to be canned or marketed. The chute U is attached to a portion of the frame Q and its inner end is bent upwardly to come close against the outer wall of the inner flange O⁴ thereby preventing any of the berries from escaping over the upper end of the chute after being discharged thereon. The vines, broken hulls, and other refuse pass through the drum C and are finally discharged from the rear end of the screen F and dropped into the elevator G and are carried upward and discharged at one side of the machine in any desired way.

It will be understood from the foregoing taken in connection with the accompanying drawings that the machine while comparatively light is compact and effective for the purpose designed and is readily transportable since it is mounted upon broad tread wheels which prevent the sinking of the wheels in soft land and such wheels forming a firm support for the machine when in operation.

While the drawings illustrate an embodiment of the invention it is to be understood that various changes in the construction and arrangement of parts may be resorted to within the scope of the appended claims without departing from the nature of the invention.

It should be stated that I do not claim broadly the idea of simply attaching wheels to an agricultural or other machine would be invention, but I do claim that in this art, there are many conditions of such an unusual character as to require invention in making my machine easily transportable and practical for the work required. Heretofore such machines have always been taken apart, transported by wagons and set up again at some desired point. This is for the reason that in order to have any capacity the machines have been made very heavy and necessarily unwieldy.

In my new portable machine I have had to change many parts and generally decrease the size of parts which has been difficult in view of the fact that if the capacity were decreased to any material extent, the machine would be inoperative in the art. Many of the changes have been the subject of other appliances with no mention of portability. This is for the reason that the features involved were often as useful improvements in a stationary machine as in a portable machine, but it has been necessary to keep the idea of portability constantly in view. Then again I have had to change the parts considerably when I came to place the machine on wheels.

One of the changes I have had to make has been the shortening of the central section of the machine and lengthening to rear extension. My object is to retain the same length in total and also to be able to get the wheels closer together in order to turn shorter corners. The use of very broad wheels has been found necessary in sandy or rough country so as to span the ruts and not upset.

Figs. 8, 9 and 10 show the simplest form of the invention and emphasize the disposition of the supporting wheels with reference to the main frame and the working parts mounted thereon, such views clearly demonstrating the simplicity of the invention and the arrangement of parts whereby the machine is rendered easily transportable so as to be shifted from one place to another according to the location of work. The parts illustrated in the other views, such as the feeder, separator, elevator and propelling power have been omitted, thereby emphasizing the relationship of the wheels to the main frame which is considered as an essential feature of the present invention.

Having thus described the invention what is claimed as new is:—

1. In a hulling machine, a wheel supported frame embodying lower side beams, front uprights disposed in the rear of the forward ends of the lower side beams, and pairs of rear uprights, a hulling mechanism arranged between the front uprights and the first pair of uprights at the rear of the machine, a cleaner disposed in the rear of the hulling mechanism and between the rear pairs of uprights, front wheels arranged in advance of the front uprights, and rear wheels mounted upon the rear portions of the side beams between the rear pairs of uprights and directly below the cleaner.

2. In a hulling machine, a main frame and an under frame, the latter embodying a middle and side longitudinal beams, front uprights and rear pairs of uprights connecting the under frame with the main frame, the longitudinal beams of the under frame projecting forward of the front uprights, a hulling mechanism arranged between the front uprights and the first pair of uprights at the rear of the machine, a cleaner disposed in the rear of the hulling mechanism and between the rear pairs of uprights, a front axle operatively connected to the middle longitudinal beam and having its ends underlapping the side beams, wheels mounted upon the ends of the axle between the forward extensions of the middle and side beams, a rear axle supported by the rear ends of the longitudinal beams at a point between the rear pairs of uprights, and wheels mounted upon end portions of the rear axle and disposed within the side beams.

3. A machine of the character specified comprising a main and an under frame, the latter comprising longitudinal side beams, front uprights and rear pairs of uprights connecting the main frame with the under frame, a hulling mechanism mounted upon the main frame between the front and the first pair of rear uprights, a cleaner mounted upon the main frame between the rear pairs of uprights, front wheels disposed in advance of the front uprights and rear wheels disposed between the rear ends of the side beams and between the rear pairs of uprights comprising the rear pair and arranged directly below the cleaner.

4. A hulling machine comprising a main frame embodying front uprights, rear pairs of uprights and lower longitudinal side beams having their front ends extended forward of the front uprights, a hulling mechanism disposed between the front uprights and the rear pairs of uprights, a cleaner arranged between the rear pairs of uprights, a separator located wholly at one side of the main frame, front wheels mounted upon the front extensions of the lower side beams in advance of the front uprights and between the forward extensions of the side beams, and rear wheels mounted upon the rear ends of the side beams between such beams and the rear pairs of uprights directly below the cleaner.

5. In a machine of the character set forth, a framework, a hulling mechanism mounted upon the framework, a separator located at one side of the framework and connected thereto and supported thereby, means for collecting the berries after they are hulled and directing the same into the separator, and independent means for delivering the clean berries and the refuse from the separator.

6. In a machine of the character specified, a framework, a hulling mechanism mounted upon the framework, a separator projecting laterally from the framework and supported thereby, means for collecting the berries from the hulling mechanism and delivering the same into the separator, and means for directing a blast of air through the separator.

7. In a machine of the character set forth, the combination of a framework, a hulling mechanism mounted upon the framework, a separator projecting laterally from the framework, a pan for receiving the berries from the hulling mechanism and embodying a trough having a discharge, a chute extending from the trough to direct the berries into the separator, a fan blower and a spout leading from the fan-casing into the separator for directing a blast of air through the cleaning means of the separator.

In testimony whereof I affix my signature in presence of two witnesses.

ROBERT P. SCOTT.

Witnesses:
 THOS. T. SAVAGE,
 POWELL MAHONE.